United States Patent
Mittal et al.

(10) Patent No.: US 11,697,989 B2
(45) Date of Patent: Jul. 11, 2023

(54) MICRO INVISIBLE LOST TIME IN DRILLING OPERATIONS

(71) Applicant: Landmark Graphics Corporation, Houston, TX (US)

(72) Inventors: Manish K. Mittal, Cypress, TX (US); Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 282 days.

(21) Appl. No.: 17/004,175

(22) Filed: Aug. 27, 2020

(65) Prior Publication Data

US 2022/0065093 A1 Mar. 3, 2022

(51) Int. Cl.
| | |
|---|---|
| *E21B 44/00* | (2006.01) |
| *E21B 44/08* | (2006.01) |
| *E21B 47/003* | (2012.01) |
| *E21B 49/00* | (2006.01) |
| *E21B 45/00* | (2006.01) |
| *G06Q 10/0639* | (2023.01) |

(52) U.S. Cl.
CPC .............. *E21B 44/08* (2013.01); *E21B 44/00* (2013.01); *E21B 45/00* (2013.01); *E21B 47/003* (2020.05); *E21B 49/003* (2013.01); *G06Q 10/06393* (2013.01)

(58) Field of Classification Search
CPC ....... E21B 44/00; G06Q 10/063; G06Q 10/06
See application file for complete search history.

(56) References Cited

U.S. PATENT DOCUMENTS 6,401,054 B1 * 6/2002 Andersen ............... H02H 3/006
  702/179
7,031,840 B1   4/2006 Brett et al.
(Continued)

FOREIGN PATENT DOCUMENTS

EP    2880260    6/2015
GB    2569083    6/2019
(Continued)

OTHER PUBLICATIONS

GB Application No. GB2109834.8, "Combined Search and Examination Report", dated Dec. 9, 2021, 8 pages.
(Continued)

*Primary Examiner* — Giovanna Wright
(74) *Attorney, Agent, or Firm* — Kilpatrick Townsend & Stockton LLP

(57) ABSTRACT

A system is described for calculating and outputting micro invisible lost time (MILT). The system may include a processor and a non-transitory computer-readable medium comprising instructions that are executable by the processor to cause the processor to perform various operations. Timestamp data that includes values of drilling parameters may be received about a drilling operation, and the values of drilling parameters may be classified into a rig state that includes rig activities. For each rig activity, an actual completion time may be determined and compared to an expected completion time for determining a deviation. At least one deviated activity, in which the deviation is greater than a threshold, may be determined. Deviations may be combined into MILT that can be output for controlling the drilling operation.

20 Claims, 4 Drawing Sheets

(56) References Cited

U.S. PATENT DOCUMENTS

| | | | |
|---|---|---|---|
| 9,792,571 B1 * | 10/2017 | Mandava | E21B 41/0092 |
| 2002/0103630 A1 | 8/2002 | Aldred et al. | |
| 2014/0039860 A1 * | 2/2014 | Carvajal | E21B 43/00 |
| | | | 703/10 |
| 2014/0326449 A1 | 11/2014 | Samuel et al. | |
| 2017/0300845 A1 | 10/2017 | Mandava et al. | |
| 2021/0311966 A1 * | 10/2021 | Al-Shahri | G06Q 50/02 |

FOREIGN PATENT DOCUMENTS

| | | |
|---|---|---|
| JP | 2019517631 | 6/2019 |
| WO | 2018106223 | 6/2018 |
| WO | 2021163475 | 8/2021 |

OTHER PUBLICATIONS

PCT Application No. PCT/US2020/048094, International Search Report and Written Opinion, dated May 18, 2021, 9 pages.

* cited by examiner

MICRO INVISIBLE LOST TIME IN DRILLING OPERATIONS

TECHNICAL FIELD

The present disclosure relates generally to wellbore drilling and, more particularly (although not necessarily exclusively), to determining micro invisible lost time for controlling drilling operations.

BACKGROUND

A hydrocarbon well can include a wellbore drilled through a subterranean formation. A drilling operation to form the wellbore can involve productive time (PT), in which the drilling operation is active and drilling, and can involve non-productive time (NPT), in which the drilling operation is not drilling but may still be performing non-drilling operations. NPT may be inherent to the drilling operation, and various causes may exist for the drilling operation experiencing NPT. Examples of causes may include untrained operators, old or worn out equipment, environmental considerations, etc. It may be desirable to reduce the NPT to increase efficiency or output of the drilling operation. This may involve identifying the various causes of NPT, which can be quantified through invisible lost time (ILT) that accounts for NPT as a whole. But, assessing at the level ILT may not maximize the efficiency of the drilling operation.

DETAILED DESCRIPTION

Figure 1:
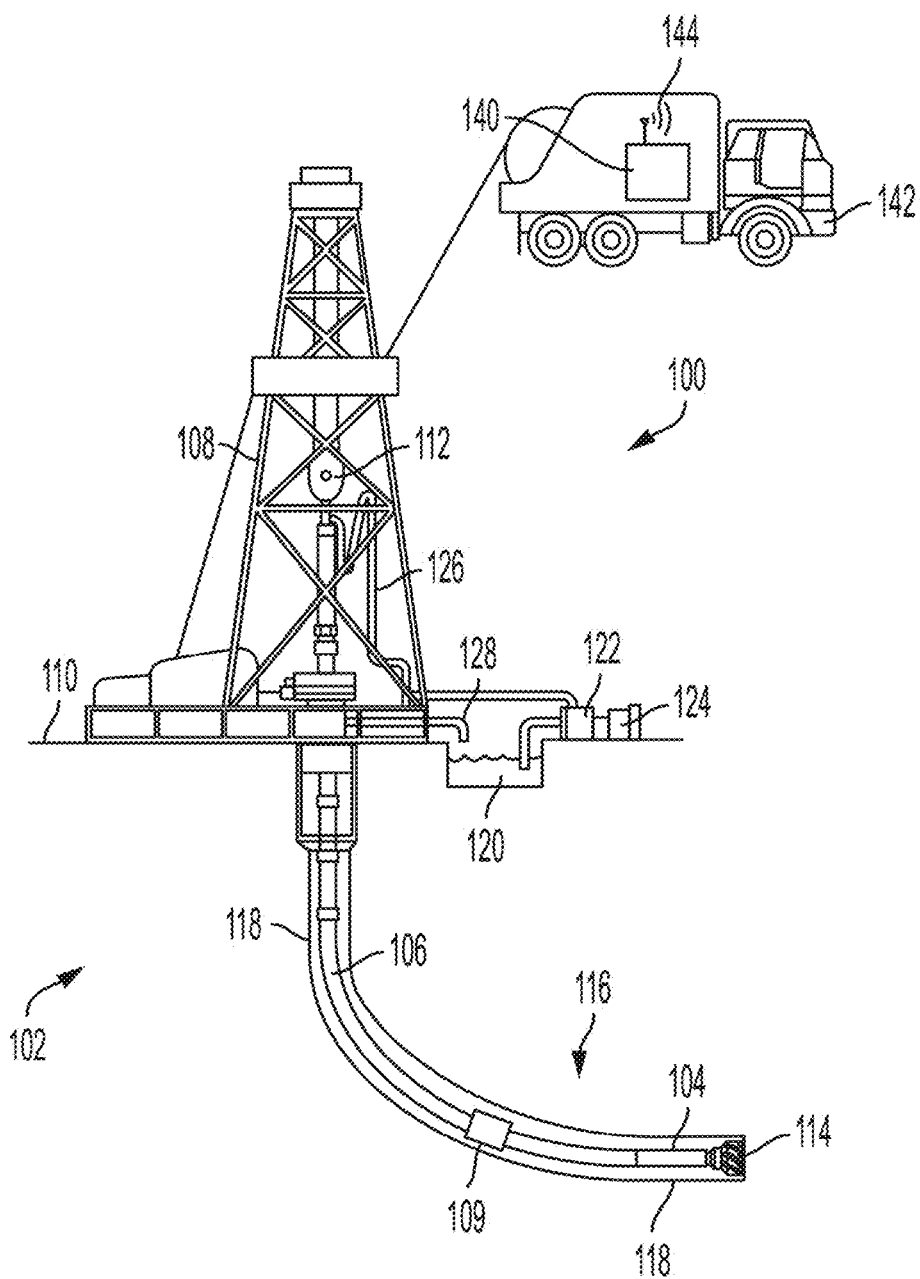
FIG. 1 is a cross-sectional view of a wellbore being formed by a drilling operation that can be controlled by assessing micro invisible lost time, according to one example of the present disclosure.

Certain aspects and examples of the present disclosure relate to identifying, determining, and outputting micro invisible lost time (MILT) for controlling a drilling operation. MILT may be a result of surface equipment design and efficiency and of process optimization and may be a non-productive time (NPT) that is part of invisible lost time (ILT) for which time frames are smaller than time frames for ILT generally. ILT may be time lost in a drilling operation not operating at a maximum theoretical performance. An example of a data rate for providing time frames for MILT assessment can be in a range of one second to ten seconds, though data rates of less than one second may also be used. Determining MILT in a drilling operation can be used to identify inefficiencies and otherwise support drilling operation optimization at a greater level as compared to assessing ILT generally. For example, MILT can be used to identify rig activities, which may be a sub-step in an overall part of a drilling operation, that are being performed inefficiently as compared to expected or predicted performance.

The drilling operation may involve productive time (PT) that may be a measure of time in which the drilling operation is active and drilling, and the drilling operation may involve NPT that is a measure of time in which the drilling operation is not drilling but may still be performing non-drilling related operations. NPT may include invisible non-productive time (INPT) that may be crew performance differences or other suitable indirect causes of NPT. PT can include ILT, which may be a difference between an actual completion time of an activity relating to drilling and an expected completion time of the activity relating to drilling. ILT may be based on a technical limit of the activity and may include calculations of key performance indicators (KPIs) of the activity, and ILT may be subsequently defined as a difference between a predefined KPI target and an actual KPI performance. The predefined KPI target may be the expected completion time, and the expected completion time may be pre-determined by benchmark values of previous drilling operations. ILT may include MILT, and causes of ILT and MILT may be similar or identical. Some examples of ILT and MILT may be untrained operators, old, worn, or otherwise suboptimal drilling equipment, and actual events not accounted for during project planning. While ILT and MILT may have similar causes, MILT may represent measures of the causes on a smaller time-scale.

Data recorded at the data rate may include time-stamp data that may include values of drilling parameters such as date, time, bit depth, hole depth, block position, hookload, and flow rate, etc. The time-stamp data may be recorded by sensors positioned on drilling equipment that may be deployed downhole in the wellbore or otherwise located at a position to sense data about the drilling operation. The time-stamp data may be real-time data, in which the sensors, immediately upon measuring the time-stamp data downhole during formation of the wellbore, directly transmit the time-stamp data to a computing device of the drilling operation for controlling the drilling operation.

During the time frame that may correspond to the recorded data rate, at least one instance of rig activity of the rig state may be identified and classified. In an example in which a set of instances of rig activity of the rig state is identified and classified, the computing system may determine a start time of the instance and an end time for each instance of rig activity of the rig state. A difference of the start time of each instance and the end time of each instance may be calculated, the difference being an actual completion time of the corresponding instance of rig activity of the rig state. The actual completion time may be compared to an expected completion time that may be pre-determined. The expected completion time may be determined by historical data from existing wellbores and may correspond to benchmark values from the existing wellbores.

The actual completion time may be less than or equal to the expected completion time, in which case an operator or supervisor of the drilling operation may desire to take no action, as the drilling operation may be operating at a desired efficiency. The actual completion time may alternatively take more time than the expected completion time, and, if the actual completion time is greater than the expected completion time by an amount greater than a pre-set threshold value, the computing device may identify the associated rig activity as a deviated rig activity. The computing device may calculate a deviation by determining the difference between the actual completion time of the deviated rig activity and the expected completion time of the deviated rig activity. The pre-set threshold value may be pre-selected based on historical data from existing wellbores and may be an average of the actual completion times of the rig activities plus a pre-selected number of standard deviations of the actual completion times of the rig activities. The pre-selected number of standard deviations may be determined by the operator or supervisor of the drilling operation. The pre-set threshold may additionally or alternatively be determined by considering dynamic downhole conditions and by comparing times for various operators to perform the associated operation.

The computing device of the drilling operation may combine the deviations of each of the deviated rig activities into MILT. The computing device may output the MILT for controlling the drilling operation. In some examples, the computing device may output the MILT directly to a display that may be communicatively coupled to the computing device. The operator or supervisor of the drilling operation may view the MILT on the display. In other examples, in response to identifying deviated rig activities, the computing device may output an alarm, a corrective action plan, or both to the display. The alarm, the corrective action, or both may include information relating to the associated deviated rig activity such as type of rig activity, the expected completion time, the actual completion time, etc. The corrective action plan may include suggestions related to modifying the drilling operation to reduce MILT such as replacing a drill bit, retraining an operator, etc.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional view of a wellbore-drilling system 100 including a wellbore 118 formed by a drilling operation that uses MILT, according to one example of the present disclosure. The wellbore 118 used to extract hydrocarbons may be created by drilling into a subterranean formation 102 using the wellbore-drilling system 100. The wellbore-drilling system 100 may drive a bottom hole assembly (BHA) 104 positioned or otherwise arranged at the bottom of a drill-string 106 extended into the subterranean formation 102 from a derrick 108 arranged at the surface 110. The derrick 108 includes a kelly 112 used to lower and raise the drill-string 106. The BHA 104 may include a drill bit 114 operatively coupled to a tool string 116, which may be moved axially within a drilled wellbore 118 as attached to the drill-string 106. The tool string 116 may include one or more sensors 109 for determining conditions in the wellbore 118. The sensors 109 may be positioned on drilling equipment, which may be deployable downhole in the wellbore 118, and may sense values of drilling parameters for a drilling operation. The sensors 109 can send real-time signals to the surface 110 via a wired or wireless connection, and the sensors 109 may send real-time data relating to the drilling operation to the surface 110. The combination of any support structure (in this example, the derrick 108), any motors, electrical equipment, and support for the drill-string and tool string may be referred to herein as a drilling arrangement.

During operation, the drill bit 114 penetrates the subterranean formation 102 to create the wellbore 118. The BHA 104 can provide control of the drill bit 114 as the drill bit 114 advances into the subterranean formation 102. The combination of the BHA 104 and the drill bit 114 can be referred to as a drilling tool. Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drill-string 106 and conveys the same to the drill bit 114. The mud exits one or more nozzles (not shown) arranged in the drill bit 114 and in the process cools the drill bit 114. After exiting the drill bit 114, the mud circulates back to the surface 110 via the annulus defined between the wellbore 118 and the drill-string 106, and hole cleaning can occur which involves returning the drill cuttings and debris to the surface. The cuttings and mud mixture are passed through a flow line 128 and are processed such that a cleaned mud is returned down hole through the stand pipe 126 once again.

The drilling arrangement and any sensors 109 (through the drilling arrangement or directly) may be communicatively coupled to a computing device 140. The computing device 140 may be configured to identify, calculate, and output MILT for controlling the drilling operation. In FIG. 1, the computing device 140 is illustrated as being deployed in a work vehicle 142; however, a computing device to receive data from the sensors 109 and to control the drill bit 114 can be permanently installed with the drilling arrangement, be hand-held, or be remotely located. Although one computing device 140 is depicted in FIG. 1, in other examples, more than one computing device can be used, and together, the multiple computing devices can perform operations, such as those described in the present disclosure.

The computing device 140 can be positioned below-ground, aboveground, onsite, in a vehicle, offsite, etc. The computing device 140 can include a processor interfaced with other hardware via a bus. A memory, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 140. In some aspects, the computing device 140 can include input/output interface components (e.g., a display, printer, keyboard, touch-sensitive surface, and mouse) and additional storage.

The computing device 140 can include a communication device 144. The communication device 144 can represent one or more of any components that facilitate a network connection. In the example shown in FIG. 1, the communication devices 144 are wireless and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device 144 can use acoustic waves, surface waves, vibrations, optical waves, or induction (e.g., magnetic induction) for engaging in wireless communications. In other examples, the communication device 144 can be wired and can include interfaces such as Ethernet, USB, IEEE 1394, or a fiber optic interface. In an example with at least one other computing device, the computing device 140 can receive wired or wireless communications from the other computing device and perform one or more tasks based on the communications.

Figure 2:
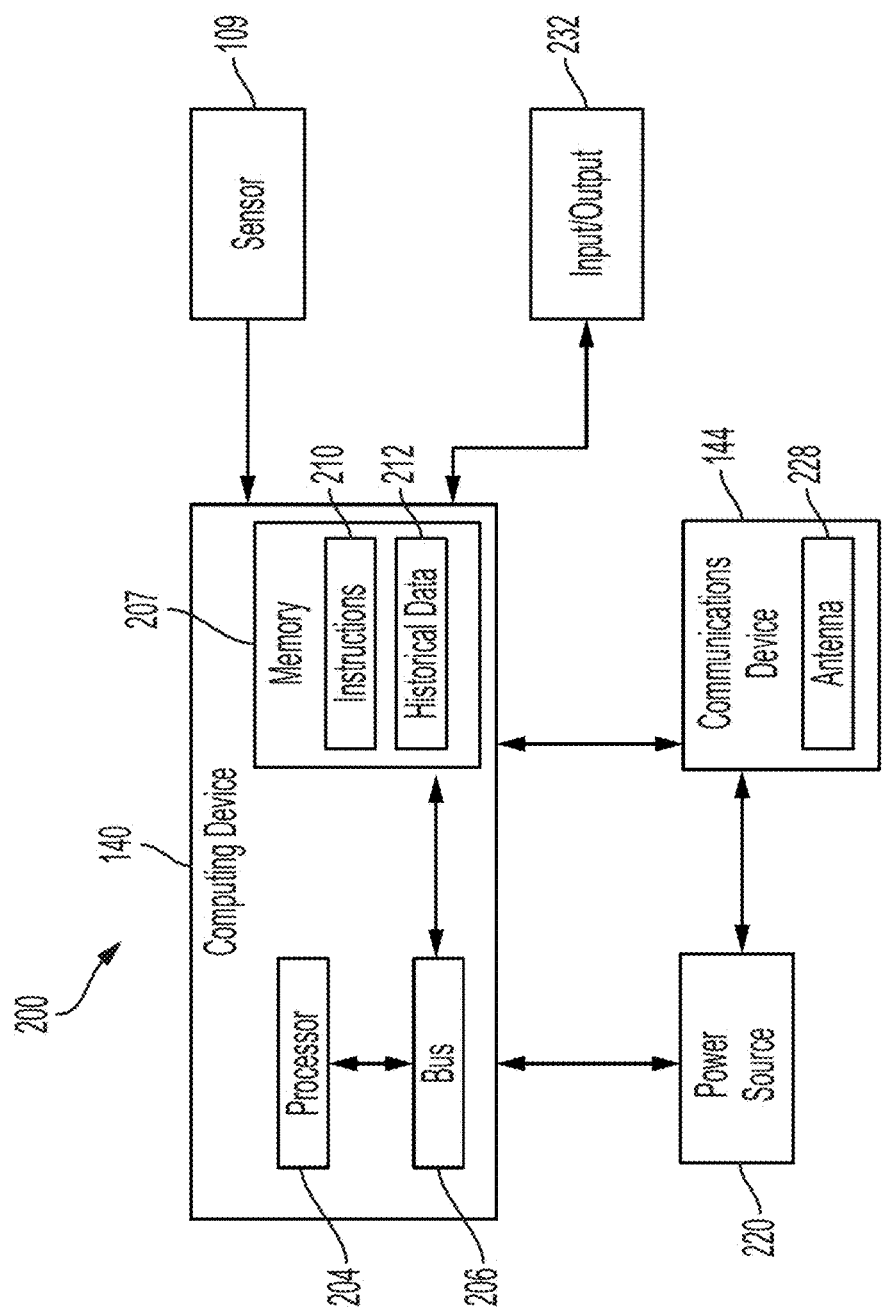
FIG. 2 is a block diagram of a computing system for determining and outputting micro invisible lost time in a drilling operation, according to one example of the present disclosure.

FIG. 2 is a block diagram of a computing system 200 for calculating and outputting MILT in a drilling operation, according to one example of the present disclosure. In some examples, the components shown in FIG. 2 (e.g. the computing device 140, power source 220, and communications device 144) can be integrated into a single structure. For example, the components can be within a single housing. In other examples, the components shown in FIG. 2 can be distributed via separate housings or otherwise, and in electrical communication with each other.

The system 200 may include the computing device 140. The computing device 140 can include a processor 204, a memory 207, and a bus 206. The processor 204 can execute one or more operations for identifying, calculating, and outputting MILT for automatically controlling the drilling operation. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 207 can include computer program instructions 210 for automatically controlling a drilling operation in part by using input data from the sensor 109. The input data from the sensor 109 may be real-time data related to the wellbore 118 and related to values of drilling parameters. The instructions 210, when executed, may cause the processor 204 to identify, calculate, and output MILT for controlling the drilling operation. The memory 207 may additionally include historical data 212 that may be used to determine benchmark values from existing wellbores.

The system 200 can include a power source 220. The power source 220 can be in electrical communication with the computing device 140 and the communications device 144. In some examples, the power source 220 can include a battery or an electrical cable (e.g., a wireline). The power source 220 can include an AC signal generator. The computing device 140 can operate the power source 220 to apply a transmission signal to the antenna 228 to forward data relating to drilling parameters, drilling objectives, drilling operation results, etc. to other systems. For example, the computing device 140 can cause the power source 220 to apply a voltage with a frequency within a specific frequency range to the antenna 228. This can cause the antenna 228 to generate a wireless transmission. In other examples, the computing device 140, rather than the power source 220, can apply the transmission signal to the antenna 228 for generating the wireless transmission.

In some examples, part of the communications device 144 can be implemented in software. For example, the communications device 144 can include additional instructions stored in memory 207 for controlling functions of the communication device 144. The communications device 144 can receive signals from remote devices and transmit data to remote devices. For example, the communications device 144 can transmit wireless communications that are modulated by data via the antenna 228. In some examples, the communications device 144 can receive signals (e.g. associated with data to be transmitted) from the processor 204 and amplify, filter, modulate, frequency shift, or otherwise manipulate the signals. In some examples, the communications device 144 can transmit the manipulated signals to the antenna 228. The antenna 228 can receive the manipulated signals and responsively generate wireless communications that carry the data.

The computing system 200 can receive input from sensors 109. The computing system 200 in this example also includes input/output interface 232. Input/output interface 232 can connect to a keyboard, pointing device, display, and other computer input/output devices. An operator may provide input using the input/output interface 232. MILT, and the causes thereof, can be displayed to an operator of the drilling operation through a display that is connected to or is part of input/output interface 232. The displayed values can provide an advisory function to the operator, or to a supervisor of the drilling operation, who can make adjustments based on the displayed values. Alternatively, the instructions 210 can exercise real-time control over the drilling operation through input/output interface 232, automatically altering drilling parameters based on calculated MILT or corrective actions formed in response to the calculated MILT.

Figure 3:
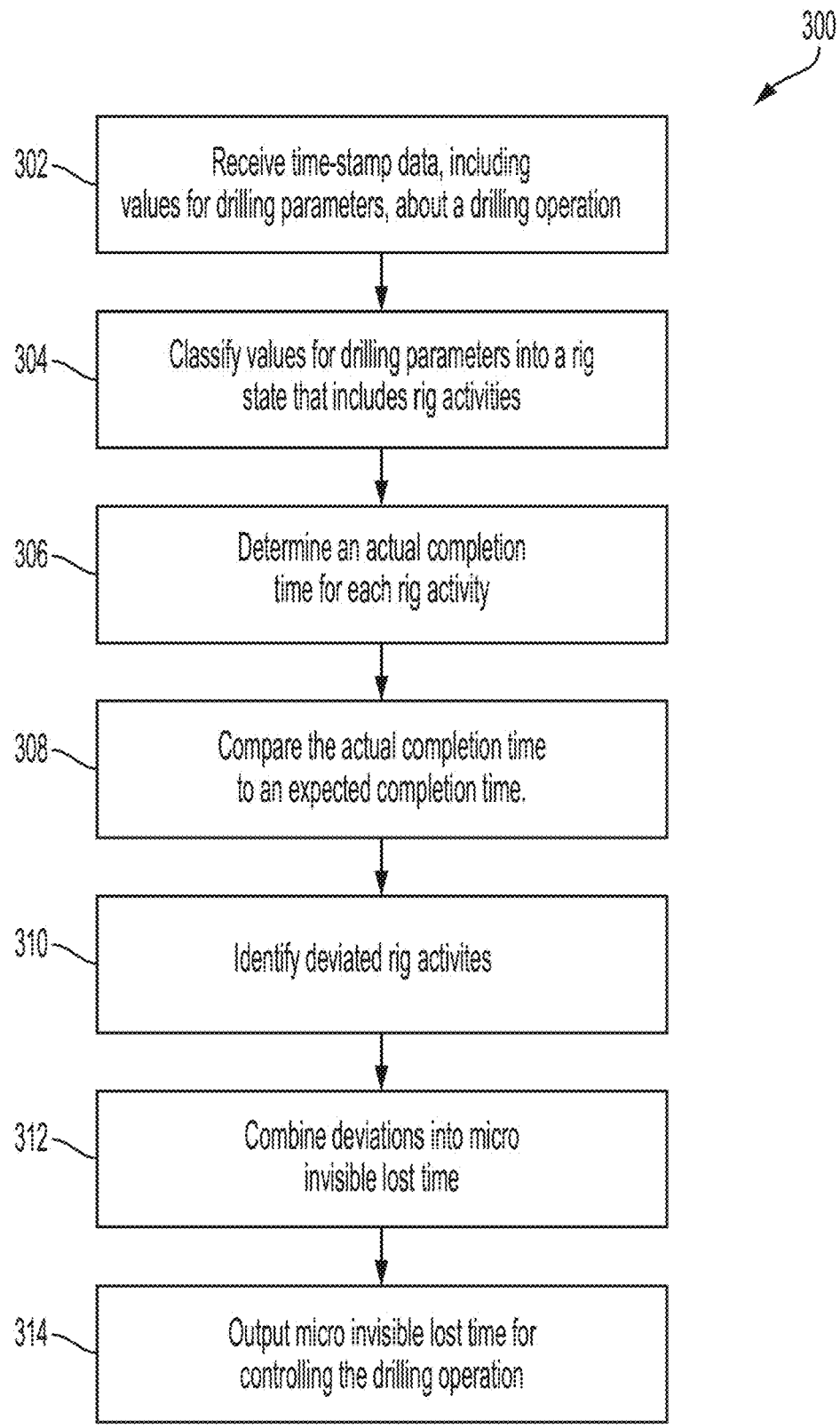
FIG. 3 is a flowchart of a process for calculating and outputting micro invisible lost time in a drilling operation, according to one example of the present disclosure.

FIG. 3 is a flowchart of a process 300 for determining and outputting MILT in a drilling operation, according to one example of the present disclosure. At block 302, time-stamp data about a drilling operation is received. The time-stamp data may include information about a wellbore being formed by the drilling operation such as the wellbore 118. Information about the wellbore 118 may include values of drilling parameters like date, time, bit depth, hole depth, block position, hookload, and flow rate, etc. The time-stamp data may be real-time data, in which sensors of the drilling operation, like the sensors 109, immediately upon measuring the time-stamp data downhole during formation of the wellbore 118, directly transmit the time-stamp data to a computing device of the drilling operation such as the computing device 140.

The time-stamp data may be received by the computing device 140 and may be cleaned, in which filters may be applied to the time-stamp data for removing outlier data or otherwise selecting insignificant data to exclude from determining MILT. The filters may be determined based on pre-set rules formed from historical data of existing wellbores.

At block 304, values of drilling parameters are classified into a rig state, being a sub-process of the drilling operation. This classification may involve determining what type of sub-process the drilling operation is performing based on the values of drilling parameters received at block 302. The classification of sub-process, or rig state, may be made by the computing device 140, and the rig state may include at least one rig activity that may include backreaming, circulating, in-slip, tripping in, tripping out, rotary drilling, sliding, off bottom, reaming, etc. The computing device 140 may identify, for each instance of rig activity of the classified rig state, a start time and an end time, and the computing device 140 may use the start time and the end time for each rig activity for subsequent calculation.

At block 306, an actual completion time for each rig activity is determined. The computing device 140 may use the start time and the end time for each rig activity to calculate the actual completion time for each rig activity. The start time of the rig activity may be read by the computing device 140 from the time-stamp data. For example, a sliding rig activity may be identified by the computing device 140, and the first time in the time-stamp data that the sliding rig activity occurs may be determined by the computing device 140 to be the start time of the sliding rig activity. The computing device 140 may determine the end time of the rig activity by identifying a change in rig activity. For example, the rig activity of the classified rig state may change from rotary drilling to reaming, and the computing device 140 may determine the end time of the rotary drilling rig activity by using the first time of the reaming rig activity from the time-stamp data. Additionally or alternatively, an operator or supervisor of the drilling operation may manually input the start time of the rig activity, the end time of the rig activity, or both. The actual completion time for an instance of rig activity may comprise a difference between the start time of the instance of rig activity and the end time of the instance of rig activity.

At block 308, the actual completion time of each instance of rig activity is compared to an expected completion time of the rig activity. The expected completion time of the rig activity may be pre-determined and may correspond to benchmark values from historical data from existing wellbores. In some examples, the pre-determined expected completion time may be calculated by the computing device 140 that uses benchmark values based on historical data from existing wellbores, the benchmark values being average completion times of the associated rig activity. In other examples, an operator or supervisor of the drilling operation may manually set the expected completion time based on experience. The expected completion time may be unique to each rig activity. For example, an expected completion time for reaming may be different from an expected completion time for rotary drilling. And, an actual completion time for reaming may be compared to an expected completion time for reaming but may not be compared to an expected completion time for rotary drilling. An output of the comparison may be a difference of the expected completion time and the actual completion time, and, in some examples, the difference may be considered a deviation.

At block 310, deviated rig activities are identified. The actual completion time of a rig activity may be less than or equal to the expected completion time. In this example, an operator or supervisor of the drilling operation may not take action. But, the actual completion time of the rig activity may be greater than the expected completion time. If the actual completion time of the rig activity is greater than the expected completion time by an amount exceeding a pre-set threshold, the computing device 140 may identify the corresponding instance of rig activity as a deviated rig activity. In some examples, the pre-set threshold may be determined by performing variance analysis on a dataset that includes all instances of rig activity included in the cleaned time-stamp data. And, the pre-set threshold may be an average of the dataset plus a pre-selected number of standard deviations of the dataset. In some examples, the pre-set threshold may be an average of the dataset plus one standard deviation of the dataset. Variance analysis may be performed by the computing device 140. In some examples, the variance analysis is performed by online statistical analysis that may involve the computing device 140 accessing a public network, such as the Internet, to perform the variance analysis. The variance analysis may include generating a lower bound, that may be similar or identical to the expected completion time, and comparing the lower bound to the actual completion time to calculate a deviation.

At block 312, the identified deviations are combined into MILT, the combined deviations comprising deviations from each identified, deviated rig activity. Subsequent to performing variance analysis and in response to identifying deviate rig activities at block 310, the computing device 140 may combine the deviations to calculate the MILT. For each identified, deviated rig activity, a difference between the actual completion time and the expected completion time may be calculated, the difference being a deviation. Combining the deviations may involve the computing device 140 adding the deviations from each identified, deviated rig activity, the resulting sum being the MILT. The computing device 140 may subsequently output the MILT.

At block 314, MILT is output for controlling the drilling operation. The MILT calculated at block 312 may be output by the computing device 140 for viewing by the operator or supervisor of the drilling operation. In some examples, an alarm may be generated by the computing device 140 in response to identifying deviated rig activities. The alarm may be output to a display for viewing by the operator or supervisor of the drilling operation. Suggestions for corrective action plans may additionally be output by the computing device 140. For example, in response to identifying a deviated instance of rotary drilling, the computing device 140 may suggest to inspect or replace a bit to increase subsequent efficiency of rotary drilling instances. Subsequent to viewing the alarm, the suggested corrective action plan, or both, the operator or supervisor of the drilling operation may monitor or modify the drilling operation. For instance, the operator or supervisor of the drilling operation may update values of drilling parameters in response to viewing the alarm or the corrective action plan generated by the computing device 140 upon identifying MILT.

Figure 4:
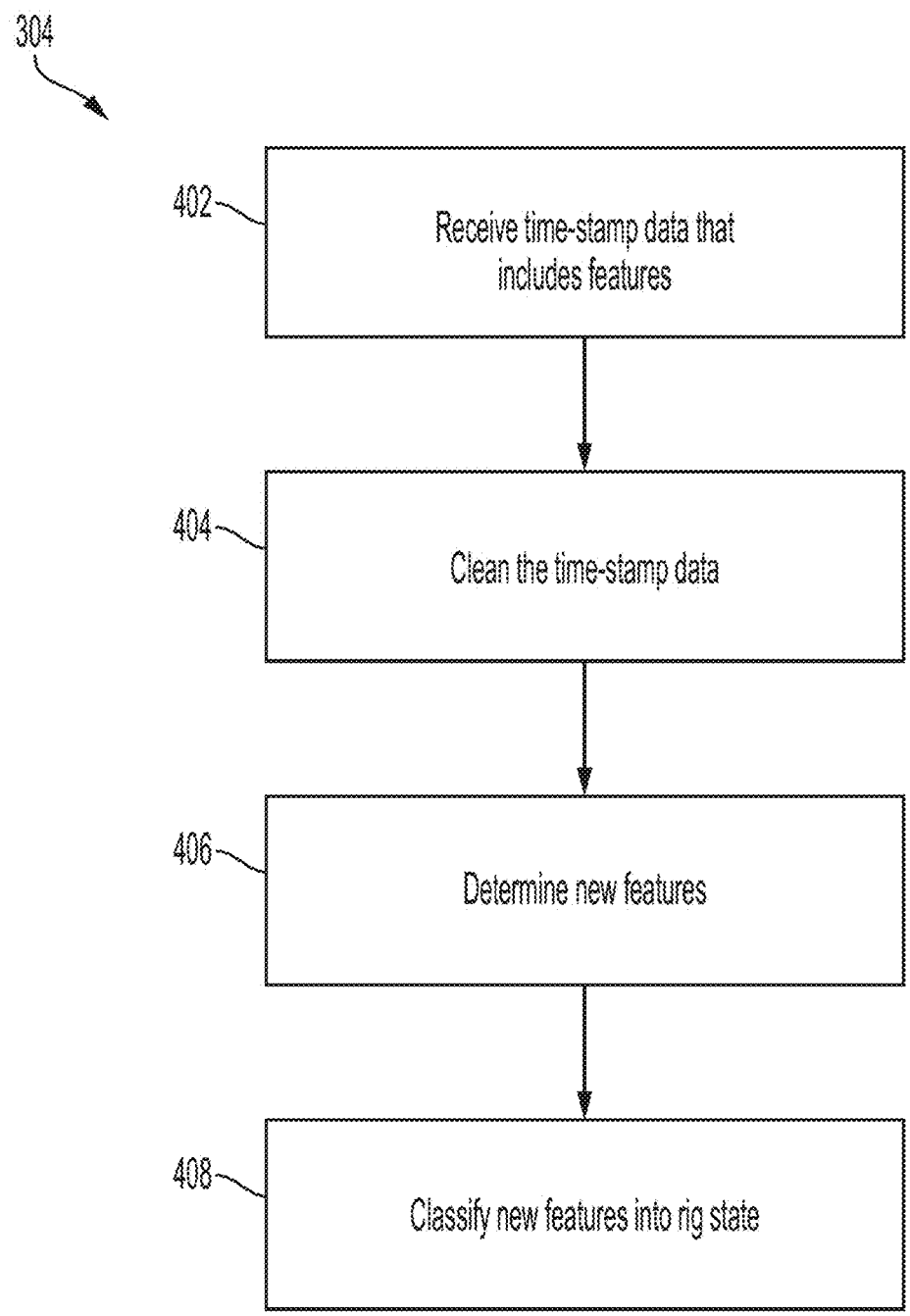
FIG. 4 is a flowchart of a process for classifying values of drilling parameters into a rig state for calculating micro invisible lost time, according to one example of the present disclosure.

FIG. 4 is a flowchart of one example of classifying values of drilling parameters into a rig state for calculating MILT, as in block 304 from FIG. 3. At block 402, time-stamp data is received that includes features. The features may be values of drilling parameters and may include bit-depth, hole-depth, block position, weight on bit, rate of penetration, etc. The time-stamp data may be similar or identical to the time-stamp data received at block 302 in process 300. In some examples, the time-stamp data may be real-time data and may include features that may include values of drilling parameters of a drilling operation such as the wellbore-drilling system 100.

At block 404, the time-stamp data that includes the features is cleaned. As received at block 402, the time-stamp data may include outliers or other features or values of drilling parameters that may be otherwise undesirable to use. A cleaning algorithm may be applied to filter the time-stamp data. The cleaning algorithm may involve applying pre-selected filters to the time-stamp data to remove the outliers or otherwise undesirable values or any other cleaning operation suitable for cleaning the time-stamp data.

At block 406, new features are determined from the features in the time-stamp data. The features may be reclassified by a computing device of the drilling operation, such as the computing device 140, into new features that may be input into a classification algorithm. The classification algorithm may take, as an input, the features of the time-stamp data, and the classification algorithm may output the new features. In some examples, a neural network may be used by the classification algorithm to map the features of the time-stamp data to the new features. In other examples, the classification algorithm may include predefined mappings between the features of the time-stamp data and the new features. The predefined mappings that help determine the new features may be manually input into the classification algorithm or may be determined by historical data from existing wellbores.

At block 408, the new features are used to classify the features of the time-stamp data into rig states. The new features determined at block 406 may be input into an algorithm for classifying rig states. The algorithm may take as an input the new features and may output a classified rig state, including rig activities, that may correspond to the features from the time-stamp data. In some examples, a neural network may be used by the algorithm to map the new features determined at block 406 to the classified rig state. In other examples, the algorithm may include predefined mappings between the new features and the classified rig state. The predefined mappings that help classify the rig state may be manually input into the algorithm or may be determined by historical data from existing wellbores.

In some aspects, systems, methods, and non-transitory computer-readable mediums for automatically controlling a wellbore drilling operation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving time-stamp data about a drilling operation, the time-stamp data including values for drilling parameters associated with different time frames corresponding to a recorded data rate; classifying the values for the drilling parameters into a rig state that represents a status for the drilling operation, the rig state involving a plurality of rig activities; for each respective rig activity of the plurality of rig activities: determining an actual completion time; comparing the actual completion time to an expected completion time associated with the respective rig activity to determine a deviation for the respective rig activity, the deviation being a difference between the actual completion time and the expected completion time associated with the respective rig activity; and identifying, as one or more deviated activities, one or more rig activities of the plurality of rig activities for which the deviation is greater than a pre-set threshold; combining deviations for the respective rig activities into micro invisible lost time that represents invisible lost time in one or more time frames corresponding to the recorded data rate; and outputting the micro invisible lost time for controlling the drilling operation.

Example 2 is the system of example 1, wherein the pre-set threshold is an average completion time for types of the plurality of rig activities added to a pre-selected number of standard deviations from average completion time for the types of the plurality of rig activities, and wherein the operations further comprise: generating an alarm for each deviated activity of the one or more deviated activities that take more time than the pre-set threshold; and formulating a corrective action plan for reducing the micro invisible lost time and outputting the corrective action plan with the alarm.

Example 3 is the system of examples 1 and 2, wherein the rig state that represents a status for the drilling operation corresponds to at least one of bit-depth, hole-depth, or block position, and wherein the operations further comprise: filtering the time-stamp data to remove outliers based on pre-set rules formed from historical data of existing wellbores, the filtering creating a cleaned time-stamp dataset; and calculating the pre-set threshold with variance analysis, the variance analysis comprising an average and a standard deviation.

Example 4 is the system of examples 1-3, wherein the operation of classifying the values for the drilling parameters into a rig state that represents a status for the drilling operation involves using the cleaned time-stamp dataset, and wherein the variance analysis is calculable with online statistical analysis.

Example 5 is the system of example 1, wherein the time-stamp data is real-time data from a wellbore of the drilling operation, real-time data being data about the wellbore of the drilling operation that is measured during formation of the wellbore and directly delivered to a computing system of the drilling operation and used to modify the drilling operation, and wherein the time-stamp data includes date and time, bit depth, hole depth, block position, hookload, and flow rate.

Example 6 is the system of example 1, wherein the time-stamp data includes date and time, bit depth, hole depth, block position, hookload, and flow rate, and wherein the expected completion time associated with the respective rig activity corresponds to benchmark values from historical data about existing wellbores.

Example 7 is the system of example 1, wherein the rig state is backreaming, circulating, in-slip, tripping in, tripping out, rotary drilling, sliding, off bottom, or reaming.

Example 8 is a method comprising: receiving time-stamp data about a drilling operation, the time-stamp data including values for drilling parameters associated with different time frames corresponding to a recorded data rate; classifying the values for the drilling parameters into a rig state that represents a status for the drilling operation, the rig state involving a plurality of rig activities; for each respective rig activity of the plurality of rig activities: determining an actual completion time; comparing the actual completion time to an expected completion time associated with the respective rig activity to determine a deviation for the respective rig activity, the deviation being a difference between the actual completion time and the expected completion time associated with the respective rig activity; and identifying, as one or more deviated activities, one or more rig activities of the plurality of rig activities for which the deviation is greater than a pre-set threshold; combining deviations for the respective rig activities into micro invisible lost time that represents invisible lost time in one or more time frames corresponding to the recorded data rate; and outputting the micro invisible lost time for controlling the drilling operation.

Example 9 is the method of example 8, wherein the pre-set threshold is an average completion time for types of the plurality of rig activities added to a pre-selected number of standard deviations from average completion time for the types of the plurality of rig activities, further comprising: generating an alarm for each deviated activity of the one or more deviated activities that take more time than the pre-set threshold; and formulating a corrective action plan for reducing the micro invisible lost time and outputting the corrective action plan with the alarm.

Example 10 is the method of examples 8 and 9, wherein the rig state that represents a status for the drilling operation corresponds to at least one of bit-depth, hole-depth, or block position, further comprising: filtering the time-stamp data to remove outliers based on pre-set rules formed from historical data of existing wellbores, the filtering creating a cleaned time-stamp dataset; and calculating the pre-set threshold with variance analysis, the variance analysis comprising an average and a standard deviation.

Example 11 is the method of examples 8-10, wherein classifying the values for the drilling parameters into a rig state that represents a status for the drilling operation involves using the cleaned time-stamp dataset, and wherein the variance analysis is calculable with online statistical analysis.

Example 12 is the method of example 8, wherein the time-stamp data is real-time data from a wellbore of the drilling operation, real-time data being data about the wellbore of the drilling operation that is measured during formation of the wellbore and directly delivered to a computing system of the drilling operation and used to modify the drilling operation, and wherein the time-stamp data includes date and time, bit depth, hole depth, block position, hookload, and flow rate.

Example 13 is the method of example 8, wherein the time-stamp data includes date and time, bit depth, hole depth, block position, hookload, and flow rate, and wherein the expected completion time associated with the respective rig activity corresponds to benchmark values from historical data about existing wellbores.

Example 14 is the method of example 8, wherein the rig state is backreaming, circulating, in-slip, tripping in, tripping out, rotary drilling, sliding, off bottom, or reaming.

Example 15 is a non-transitory computer-readable medium comprising instructions that are executable by a processing device for causing the processing device to perform operations comprising: receiving time-stamp data about a drilling operation, the time-stamp data including values for drilling parameters associated with different time frames corresponding to a recorded data rate; classifying the values for the drilling parameters into a rig state that represents a status for the drilling operation, the rig state involving a plurality of rig activities; for each respective rig activity of the plurality of rig activities: determining an actual completion time; comparing the actual completion time to an expected completion time associated with the respective rig activity to determine a deviation for the respective rig activity, the deviation being a difference between the actual completion time and the expected completion time associated with the respective rig activity; and identifying, as one or more deviated activities, one or more rig activities of the plurality of rig activities for which the deviation is greater than a pre-set threshold; combining deviations for the respective rig activities into micro invisible lost time that represents invisible lost time in one or more time frames corresponding to the recorded data rate; and outputting the micro invisible lost time for controlling the drilling operation.

Example 16 is the non-transitory computer-readable medium of example 15, wherein the pre-set threshold is an average completion time for types of the plurality of rig activities added to a pre-selected number of standard deviations from average completion time for the types of the plurality of rig activities, and wherein the operations further comprise: generating an alarm for each deviated activity of the one or more deviated activities that take more time than the pre-set threshold; and formulating a corrective action plan for reducing the micro invisible lost time and outputting the corrective action plan with the alarm.

Example 17 is the non-transitory computer-readable medium of examples 15 and 16, wherein the rig state that represents a status for the drilling operation corresponds to at least one of bit-depth, hole-depth, or block position, and wherein the operations further comprise: filtering the time-stamp data to remove outliers based on pre-set rules formed from historical data of existing wellbores, the filtering creating a cleaned time-stamp dataset; and calculating the pre-set threshold with variance analysis, the variance analysis comprising an average and a standard deviation.

Example 18 is the non-transitory computer-readable medium of examples 15-17, wherein the operation of classifying the values for the drilling parameters into a rig state that represents a status for the drilling operation involves using the cleaned time-stamp dataset, and wherein the variance analysis is calculable with online statistical analysis.

Example 19 is the non-transitory computer-readable medium of example 15, wherein the time-stamp data is real-time data from a wellbore of the drilling operation, real-time data being data about the wellbore of the drilling operation that is measured during formation of the wellbore and directly delivered to a computing system of the drilling operation and used to modify the drilling operation, and wherein the time-stamp data includes date and time, bit depth, hole depth, block position, hookload, and flow rate.

Example 20 is the non-transitory computer-readable medium of example 15, wherein the time-stamp data includes date and time, bit depth, hole depth, block position, hookload, and flow rate, and wherein the expected completion time associated with the respective rig activity corresponds to benchmark values from historical data about existing wellbores, and wherein the rig state is backreaming, circulating, in-slip, tripping in, tripping out, rotary drilling, sliding, off bottom, or reaming.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processor; and
   a non-transitory computer-readable medium comprising instructions that are executable by the processor to cause the processor to perform operations comprising:
   receiving time-stamp data about a drilling operation;
   filtering the time-stamp data to remove outliers based on pre-set rules formed from historical data of existing wellbores, the filtering creating a cleaned time-stamp dataset, the cleaned time-stamp data including values for drilling parameters associated with different time frames corresponding to a recorded data rate;
   classifying the values for the drilling parameters into a rig state that represents a status for the drilling operation, the rig state involving a plurality of rig activities;
   for each respective rig activity of the plurality of rig activities:
     determining an actual completion time;
     comparing the actual completion time to an expected completion time associated with the respective rig activity to determine a deviation for the respective rig activity, the deviation being a difference between the actual completion time and the expected completion time associated with the respective rig activity; and identifying, as one or more deviated activities, one or more rig activities of the plurality of rig activities for which the deviation is greater than a pre-set threshold;

combining deviations for the respective rig activities into micro invisible lost time that represents invisible lost time in one or more time frames corresponding to the recorded data rate; and controlling a drilling operation using the micro invisible lost time.

2. The system of claim 1, wherein the pre-set threshold is an average completion time for types of the plurality of rig activities added to a pre-selected number of standard deviations from average completion time for the types of the plurality of rig activities, and wherein the operations further comprise:

generating an alarm for each deviated activity of the one or more deviated activities that take more time than the pre-set threshold; and formulating a corrective action plan for reducing the micro invisible lost time and outputting the corrective action plan with the alarm.

3. The system of claim 2, wherein the rig state that represents a status for the drilling operation corresponds to at least one of bit-depth, hole-depth, or block position, and wherein the operations further comprise:

calculating the pre-set threshold with variance analysis, the variance analysis comprising an average and a standard deviation.

4. The system of claim 3, wherein the operation of classifying the values for the drilling parameters into a rig state that represents a status for the drilling operation involves using the cleaned time-stamp dataset, and wherein the variance analysis is calculable with online statistical analysis.

5. The system of claim 1, wherein the time-stamp data is real-time data from a wellbore of the drilling operation, real-time data being data about the wellbore of the drilling operation that is measured during formation of the wellbore and directly delivered to a computing system of the drilling operation and used to modify the drilling operation, and wherein the time-stamp data includes date and time, bit depth, hole depth, block position, hookload, and flow rate.

6. The system of claim 1, wherein the time-stamp data includes date and time, bit depth, hole depth, block position, hookload, and flow rate, and wherein the expected completion time associated with the respective rig activity corresponds to benchmark values from historical data about existing wellbores.

7. The system of claim 1, wherein the recorded data rate is less than 10 seconds.

8. A method comprising:
receiving time-stamp data about a drilling operation;
filtering the time-stamp data to remove outliers based on pre-set rules formed from historical data of existing wellbores, the filtering creating a cleaned time-stamp dataset, the cleaned time-stamp data including values for drilling parameters associated with different time frames corresponding to a recorded data rate;

classifying the values for the drilling parameters into a rig state that represents a status for the drilling operation, the rig state involving a plurality of rig activities;

for each respective rig activity of the plurality of rig activities:

determining an actual completion time;

comparing the actual completion time to an expected completion time associated with the respective rig activity to determine a deviation for the respective rig activity, the deviation being a difference between the actual completion time and the expected completion time associated with the respective rig activity; and identifying, as one or more deviated activities, one or more rig activities of the plurality of rig activities for which the deviation is greater than a pre-set threshold;

combining deviations for the respective rig activities into micro invisible lost time that represents invisible lost time in one or more time frames corresponding to the recorded data rate; and controlling a drilling operation using the micro invisible lost time.

9. The method of claim 8, wherein the pre-set threshold is an average completion time for types of the plurality of rig activities added to a pre-selected number of standard deviations from average completion time for the types of the plurality of rig activities, further comprising:

generating an alarm for each deviated activity of the one or more deviated activities that take more time than the pre-set threshold; and formulating a corrective action plan for reducing the micro invisible lost time and outputting the corrective action plan with the alarm.

10. The method of claim 9, wherein the rig state that represents a status for the drilling operation corresponds to at least one of bit-depth, hole-depth, or block position, further comprising:

calculating the pre-set threshold with variance analysis, the variance analysis comprising an average and a standard deviation.

11. The method of claim 10, wherein classifying the values for the drilling parameters into a rig state that represents a status for the drilling operation involves using the cleaned time-stamp dataset, and wherein the variance analysis is calculable with online statistical analysis.

12. The method of claim 8, wherein the time-stamp data is real-time data from a wellbore of the drilling operation, real-time data being data about the wellbore of the drilling operation that is measured during formation of the wellbore and directly delivered to a computing system of the drilling operation and used to modify the drilling operation, and wherein the time-stamp data includes date and time, bit depth, hole depth, block position, hookload, and flow rate.

13. The method of claim 8, wherein the time-stamp data includes date and time, bit depth, hole depth, block position, hookload, and flow rate, and wherein the expected completion time associated with the respective rig activity corresponds to benchmark values from historical data about existing wellbores.

14. The method of claim 8, wherein the rig state is backreaming, circulating, in-slip, tripping in, tripping out, rotary drilling, sliding, off bottom, or reaming.

15. A non-transitory computer-readable medium comprising instructions that are executable by a processing device for causing the processing device to perform operations comprising:

receiving time-stamp data about a drilling operation;

filtering the time-stamp data to remove outliers based on pre-set rules formed from historical data of existing wellbores, the filtering creating a cleaned time-stamp dataset, the cleaned time-stamp data including values for drilling parameters associated with different time frames corresponding to a recorded data rate;

classifying the values for the drilling parameters into a rig state that represents a status for the drilling operation, the rig state involving a plurality of rig activities;

for each respective rig activity of the plurality of rig activities:
- determining an actual completion time;
- comparing the actual completion time to an expected completion time associated with the respective rig activity to determine a deviation for the respective rig activity, the deviation being a difference between the actual completion time and the expected completion time associated with the respective rig activity; and
- identifying, as one or more deviated activities, one or more rig activities of the plurality of rig activities for which the deviation is greater than a pre-set threshold;

combining deviations for the respective rig activities into micro invisible lost time that represents invisible lost time in one or more time frames corresponding to the recorded data rate; and controlling a drilling operation using the micro invisible lost time.

16. The non-transitory computer-readable medium of claim 15, wherein the pre-set threshold is an average completion time for types of the plurality of rig activities added to a pre-selected number of standard deviations from average completion time for the types of the plurality of rig activities, and wherein the operations further comprise:

generating an alarm for each deviated activity of the one or more deviated activities that take more time than the pre-set threshold; and formulating a corrective action plan for reducing the micro invisible lost time and outputting the corrective action plan with the alarm.

17. The non-transitory computer-readable medium of claim 16, wherein the rig state that represents a status for the drilling operation corresponds to at least one of bit-depth, hole-depth, or block position, and wherein the operations further comprise:

calculating the pre-set threshold with variance analysis, the variance analysis comprising an average and a standard deviation.

18. The non-transitory computer-readable medium of claim 17, wherein the operation of classifying the values for the drilling parameters into a rig state that represents a status for the drilling operation involves using the cleaned time-stamp dataset, and wherein the variance analysis is calculable with online statistical analysis.

19. The non-transitory computer-readable medium of claim 15, wherein the time-stamp data is real-time data from a wellbore of the drilling operation, real-time data being data about the wellbore of the drilling operation that is measured during formation of the wellbore and directly delivered to a computing system of the drilling operation and used to modify the drilling operation, and wherein the time-stamp data includes date and time, bit depth, hole depth, block position, hookload, and flow rate.

20. The non-transitory computer-readable medium of claim 15, wherein the time-stamp data includes date and time, bit depth, hole depth, block position, hookload, and flow rate, and wherein the expected completion time associated with the respective rig activity corresponds to benchmark values from historical data about existing wellbores, and wherein the rig state is backreaming, circulating, in-slip, tripping in, tripping out, rotary drilling, sliding, off bottom, or reaming.

* * * * *